United States Patent
Mackie et al.

(10) Patent No.: US 9,981,312 B2
(45) Date of Patent: May 29, 2018

(54) THREE-DIMENSION PRINTER WITH MECHANICALLY SCANNED CATHODE-COMB

(71) Applicant: Wisconsin Alumni Research Foundation, Madison, WI (US)

(72) Inventors: Thomas Rockwell Mackie, Verona, WI (US); Brandon Joseph Walker, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 244 days.

(21) Appl. No.: 14/709,009

(22) Filed: May 11, 2015

(65) Prior Publication Data
US 2016/0332228 A1 Nov. 17, 2016

(51) Int. Cl.
| | | |
|---|---|---|
| *B29C 35/08* | (2006.01) | |
| *B29C 67/00* | (2017.01) | |
| *B22F 3/105* | (2006.01) | |
| *B33Y 30/00* | (2015.01) | |
| *B33Y 50/02* | (2015.01) | |

(52) U.S. Cl.
CPC .......... *B22F 3/1055* (2013.01); *B33Y 30/00* (2014.12); *B33Y 50/02* (2014.12); *B22F 2003/1057* (2013.01); *Y02P 10/295* (2015.11)

(58) Field of Classification Search
CPC .......... B29C 67/0051; B29C 67/0077; B29C 67/0088; B29C 64/129; B29C 64/135; B29C 64/141; B29C 64/153; B29C 64/20; B29C 64/268; B29C 64/364; B29C 64/371; B33Y 30/00; B33Y 40/00; B33Y 50/02

USPC ............................................. 425/174.4, 375
See application file for complete search history.

(56) References Cited

U.S. PATENT DOCUMENTS

| | | | |
|---|---|---|---|
| 4,863,538 | A | 9/1989 | Deckard |
| 4,969,167 | A | 11/1990 | Zupancic et al. |
| 6,621,039 | B2 | 9/2003 | Wang et al. |
| 7,537,722 | B2 * | 5/2009 | Andersson .......... B29C 67/0077 425/174.4 |
| 9,490,099 | B2 | 11/2016 | Mackie et al. |
| 2011/0075802 | A1 | 3/2011 | Beckmann et al. |
| 2013/0055568 | A1 | 3/2013 | Dusel et al. |
| 2013/0108726 | A1 * | 5/2013 | Uckelmann ......... B29C 67/0007 425/375 |
| 2013/0112672 | A1 | 5/2013 | Keremes et al. |
| 2013/0142296 | A1 | 6/2013 | Piefer et al. |

(Continued)

FOREIGN PATENT DOCUMENTS

| | | |
|---|---|---|
| WO | 2011064725 A1 | 6/2011 |
| WO | 2014199149 A1 | 12/2014 |

OTHER PUBLICATIONS

International Search Report & Written Opinion, Int'l Application No. PCT/US2016/030537: dated Aug. 12, 2016.

*Primary Examiner* — Joseph S Del Sole
*Assistant Examiner* — Thu Khanh T Nguyen
(74) *Attorney, Agent, or Firm* — Boyle Fredrickson, S.C.

(57) ABSTRACT

A 3-D printer scalable to large sizes employs a combination of mechanical and electrical scanning of a linear array of electron beams that operate to melt material of a powder bed. A housing holding the electron beam sources may be maintained at a high vacuum and positioned close to a print surface to minimize electron travel in a softer vacuum surrounding a print bed.

25 Claims, 4 Drawing Sheets

(56) References Cited

U.S. PATENT DOCUMENTS

2013/0270750 A1* 10/2013 Green ................ B29C 67/0077
425/174.4
2014/0175708 A1 6/2014 Echigo et al.
2014/0374048 A1 12/2014 Kennedy et al.

* cited by examiner

THREE-DIMENSION PRINTER WITH MECHANICALLY SCANNED CATHODE-COMB

STATEMENT REGARDING FEDERALLY SPONSORED RESEARCH OR DEVELOPMENT

Not Applicable

CROSS REFERENCE TO RELATED APPLICATION

Not Applicable

BACKGROUND OF THE INVENTION

The present invention relates to three-dimension printers and in particular to a printer using electron beams to sinter or melt layers of powder into a solid object.

Three-dimension printers for implementing additive machining may create printed objects by incrementally depositing material to a print bed or previously deposited layers in a layer-by-layer fashion. A variety of different 3-D printing technologies exist. Photo polymerization techniques use lasers to polymerize a thin surface of liquid over a print bed, the latter of which is gradually withdrawn beneath the liquid surface as the object is built up. Extrusion techniques use a similar approach but extrude material such as molten plastic from a nozzle in successive layers. Powder bed systems employ a laser or electron beam to sinter or melt particles of a powder bed into a solid structure. After each layer is formed additional powder is added on top of that layer and the process repeated.

Metal objects are most frequently constructed by 3-D printers using powder bed techniques with metallic powders or an approach similar to extrusion printing that uses a wire feedstock melted at its point of contact with a preceding layer.

The ability to construct high-resolution, large models using 3-D printing is limited by the relatively low printing speed of each of these processes. A slow printing speed has a disproportionate effect on larger high-resolution models where printing volumes scale exponentially.

SUMMARY OF THE INVENTION

The present invention provides an electron beam 3-D printer that employs a cathode-comb 26 providing multiple electron beams that may be scanned both electronically and mechanically. The cathode-comb 26 permits multiple, independent and low-cost, printing locations in parallel. By mechanically scanning the cathode-comb 26, the cathode-comb 26 may be placed close to the print surface for improved resolution and greatly simplified electron optics. This close proximity of the print head to the print surface also permits the electrons to be accelerated in a hard vacuum with minimized travel through a soft vacuum between the print head in the print surface reducing scattering and increasing efficiency.

Specifically, in one embodiment, the present invention provides a three-dimension printer having a print bed for supporting an object to be printed. A printer bar extends along a transverse axis and is supported on a printer bar carriage assembly to move longitudinally with respect to, and above, the print bed at a predetermined height above a print surface. The printer bar supports a plurality of independently controllable transversely separated electron sources for generating electron beams directed toward the print bed and an electron deflector assembly for transverse deflection of the electrons of the cathodes. A powder handling system applies powder at the print surface over the print bed and a controller communicates with the electron sources and printer bar carriage to scan the electron sources over the powder on the print bed to selectively fuse the powder at the print surface into a printed object according to a program stored in a non-transient medium.

It is thus a feature of at least one embodiment of the invention to provide an architecture for a three-dimension printer that may better scale to large sizes. A cathode-comb of multiple electron sources can scale with one dimension of the printed object simply by adding cathodes.

The electron beams may be constrained to move substantially only in the transverse direction with respect to the printer bar.

It is thus a feature of at least one embodiment of the invention to provide a control method for multiple electron beams that simplifies the electron beam optics and permits close proximity of the electron beams to the printed surface even for large printed objects.

The electron deflector may provide a common deflection field across each of the electron beams to deflect the electron beams in unison.

It is thus a feature of at least one embodiment of the invention to provide a scanning mechanism for multiple adjacent electron beams that eliminates possible interference if separate scanning fields were used by scanning the beams in tandem.

The electron deflector may provide a magnetic field produced by at least one Helmholtz coil pair separated along a longitudinal axis.

It is thus a feature of at least one embodiment of the invention to provide a simple control field that may be highly uniform and conveniently positioned along the side of rather than between the individual electron beams for improved manufacturability.

The electron sources are transversely spaced by no more than one-half of a transverse range of deflection of the electron sources measured at the print surface.

It is thus a feature of at least one embodiment of the invention to provide overlap between regions of the print surface accessible by each electron beam to provide improved efficiency in the printing process by selecting between different beams to print to a given area and to permit the system to continue to operate in the face of occasional cathode failure.

The three-dimension printer may include a first housing holding a print bed and printer bar and a second housing within the first housing holding the electron sources of the printer bar. A first and second vacuum pumps may operate so that the second vacuum pump communicates with the second sealable airtight housing to pump gas from the second sealable airtight housing into the first sealable airtight housing, and the first vacuum pump communicates with the first sealable airtight housing to pump gas from the first sealable airtight housing to an exhaust point outside of the first sealable airtight housing.

It is thus a feature of at least one embodiment of the invention to promote a hard vacuum along the majority of the flight path of the electron beams recognizing the inevitability of a soft vacuum in a large print chamber.

The second housing may provide a transverse slit positioned between the electron sources and the print bed to allow passage of the electron beams throughout a transverse deflection of the electron beams and wherein the second housing is substantially sealed but for the transverse slit.

It is thus a feature of at least one embodiment of the invention to provide a geometry that allows an extremely small area opening between a hard and soft vacuum such as can be managed by reverse pumping or a thin window supported on the slit.

The three-dimension printer may include an electron transmissive window covering the slit.

It is thus a feature of at least one embodiment of the invention to permit a low attenuation material to be placed to seal the cathodes from gas and contamination, possible because of the small slot geometry and minimized pressure differential The three-dimension printer may include a removable slit cover and nitrogen purge system for filling the second housing when the first housing is unsealed.

It is thus a feature of at least one embodiment of the invention to accommodate the need to frequently open the first housing for removal of printed objects without damaging the cathodes.

The controller may receive identifications of regions on the print surface for melting by an electron beam and may select among different electron beams capable of melting that region to promote parallel operation of electron beams.

It is thus a feature of at least one embodiment of the invention to provide an optimization of the geometry of the present invention by leveraging the overlap between electron beams to promote parallel treatment of the printed surface.

Each electron beam may be associated with an electron beam detector and the controller may operate to compensate for failure of an individual cathode by employing adjacent cathodes.

It is thus a feature of at least one embodiment of the invention to provide a multiple electron beam system for large print scales that can accommodate a likelihood of cathode failures during a given print session.

These particular objects and advantages may apply to only some embodiments falling within the claims and thus do not define the scope of the invention.

DETAILED DESCRIPTION OF THE PREFERRED EMBODIMENT

Figure 1:
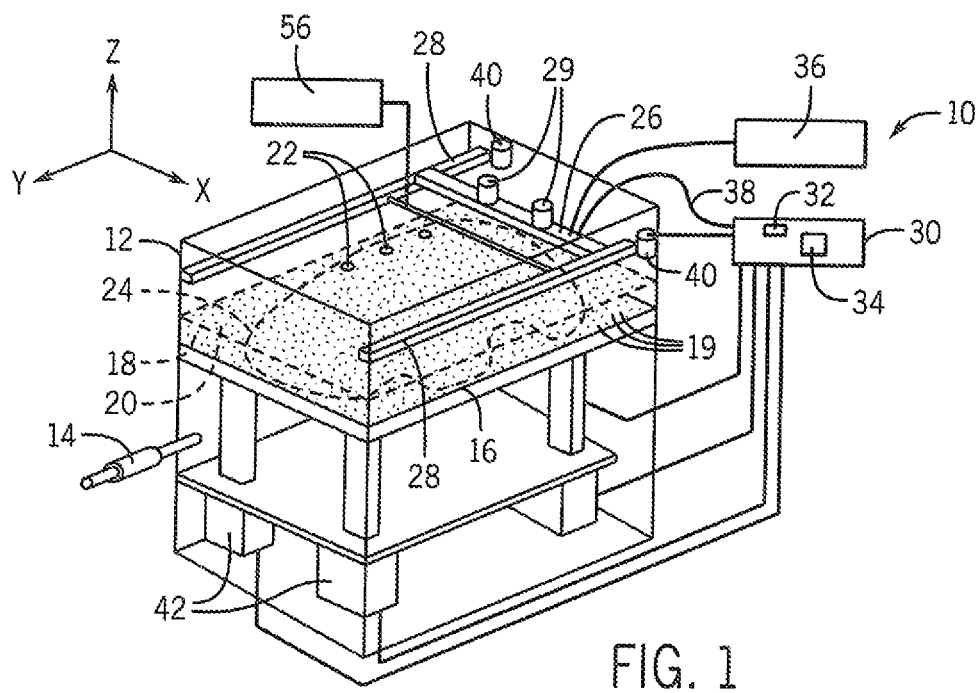
FIG. 1 is a simplified perspective view of a large-scale, three-dimension printer using the cathode-comb system of the present invention such as may travel longitudinally over a powder bed.

Referring now to FIG. 1, a large-scale, three-dimension printer 10 constructed according to one embodiment of the present invention may provide for a sealable housing 12 fitted with one or more access doors (not shown) and with a vacuum pump 14. The vacuum pump 14 is sizing constructed so that the air and other gases within the housing 12 may be removed to a pressure of $10^{-3}$ Torr to $10^{-4}$ Torr, a level readily available with mechanical vacuum pumps.

Positioned within the housing 12 to be held within the low-pressure domain is a downwardly retractable printing platform 16 presenting an upper horizontal surface that may support a powder bed 18 of finely powdered metal 19. The printing platform 16 may be retracted or extended within the housing 12, for example, by a distance in excess of five feet.

An upper surface of the powder bed 18 presents a print surface 20 that may be subjected to selective melting at melt spots 22 where the powdered metal 19 is melted or sintered together into a fully dense solid structure. After a set of desired melt regions 22 have been formed, the printing platform 16 is lowered and a new layer of powdered metal 19 applied to the powder bed 18 raising the height of the print surface 20 above the printing platform 16 by an amount substantially equal to the depth of the melt regions 22. New melt regions 22 are then formed of melted or fused powdered metal 19 on this new layer of particles to slowly build up a solid printed object 24 on a layer by layer basis. The powder bed 18 may also be constructed of other fusible materials including plastics, ceramics, and the like.

The melt regions 22 are created by localized heating from a set of electron beams extending downward from a transversely extending cathode-comb 26 positioned above the printing platform 16. As will be discussed in greater detail below, a housing of the cathode-comb 26 supports high vacuum pumps 29 which produce a hard vacuum within the housing of the cathode-comb 26 of less than 10-4 Torr.

The electron beams of the cathode-comb 26 are spaced along the transverse axis and may sweep through a limited transverse angle as will be discussed below. Further, the cathode-comb 26 is mounted on longitudinal rails 28 so that it may be scanned mechanically in a longitudinal direction perpendicular to its transverse extent. In one example, the distance of scanning may exceed 15 feet. In this way the downward beams from the cathode-comb 26 may be directed either by mechanical or electrical scanning to expose any spot within a continuous printing region of the print surface 20. A variety of techniques may be used to implement the mechanical portion of the scanning including, for example, longitudinal lead screws extending along the longitudinal rails 28 and received by corresponding threaded elements on the cathode-comb 26 and driven by servo or stepper motors or the like.

The three-dimension printer 10 may include an electronic computer 30 having one or more processors 32 and electronic memory 34 for storing, in non-transient form, a control program and data necessary for the construction of the printed object 24. Electronic computer 30 may communicate with and control various aspects of the three-dimension printer 10 discussed above and as will be discussed below including drive motor systems 40 for moving the cathode-comb 26 along the rails 28 and elevation systems 42

(hydraulics or mechanical lead screws or the like) for elevating the print platform to control positions.

The three-dimension printer 10 may also provide a power supply controllable by the computer 30 to provide power to the various mechanical elements discussed above and the circuitry of the cathode-comb 26 as will be discussed below. The electronic computer 30 and a power supply 36 may communicate over flexible conductors 38 with the cathode-comb 26 throughout its range of motion.

Figure 2:
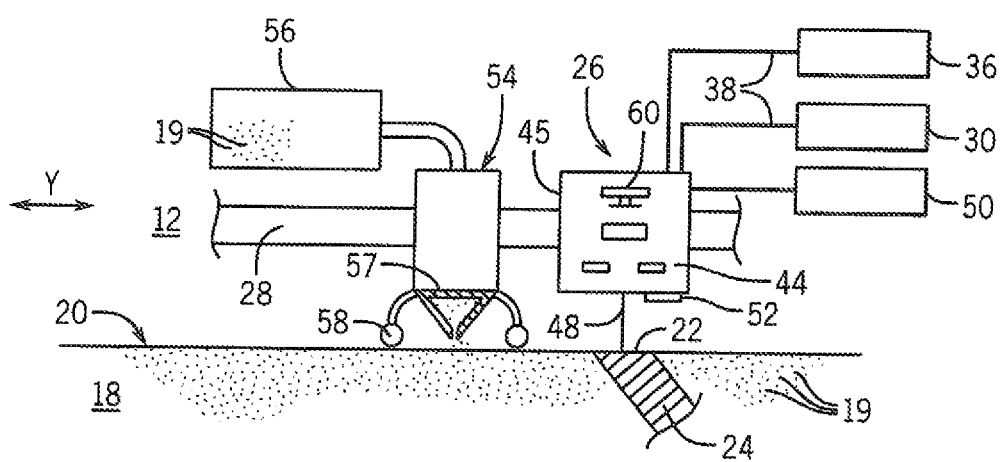
FIG. 2 is a fragmentary side elevational view of the cathode-comb closely positioned with respect to the print surface and further showing an adjacent sweeper replenishing and smoothing the powder bed.

Referring now to FIG. 2 the cathode-comb 26 may provide a housing 45 providing an internal volume 44 held at a high vacuum of 10-4 Torr or less provided by the high vacuum pumps 29 shown in FIG. 1. Inside the housing 45 a set of cathodes 60 emit beams 48 of electrons directed downward toward the print surface 20. The beams 48 will travel for the majority of their path from the cathode to the print surface 20 within the hard vacuum of volume 44 and then exit the housing 45 to travel through the softer vacuum of housing 12. Desirably this latter distance is minimized.

A source of nitrogen gas 50 may communicate with the volume 44 to fill a volume 44 when the housing 12 is open to the atmosphere to prevent oxygen poisoning of the material of the cathode 60. In embodiments where the electron beam 48 passes through an opening in the housing 45 of the cathode-comb 26, a sealing door 52 may be moved into place over that opening during such times.

Referring still to FIG. 2, rails 28 along which the cathode-comb 26 may move may be shared by one or more sweepers 54 communicating with a reservoir 56 of powdered metal 19. The sweeper 54 may include a hollow transverse bar 57 providing an internal conveyor or the like for the distribution of powdered metal 19 over the transverse dimension of the print surface 20 by means of the conveyor and over the longitudinal dimension of the print surface 20 by movement of the sweeper 54 on the rails 28 under control a computer 30. In this respect, the sweepers 54 may share the drive system of the rails 28 moving the cathode-comb 26 or may employ their own drive system. The distribution of powdered metal 19 between each printing layer as is generally known in the art may be conducted concurrently with the printing process. Print surface preheaters 58 may be attached to the bar 57 to preheat the surface 20 minimizing the amount of heat that needs to be deposited by the electron beam 48 to produce melt spots. A second similar sweeper 54 (not shown) may be placed on the opposite side of the cathode-comb 26 to distribute powdered metal 19 in bidirectional printing, or separate longitudinal rails 28 may be used to allow a single sweeper 54 to pass beneath the cathode-comb 26 upon direction reversals in the longitudinal axis.

Figures 6A, 6B:
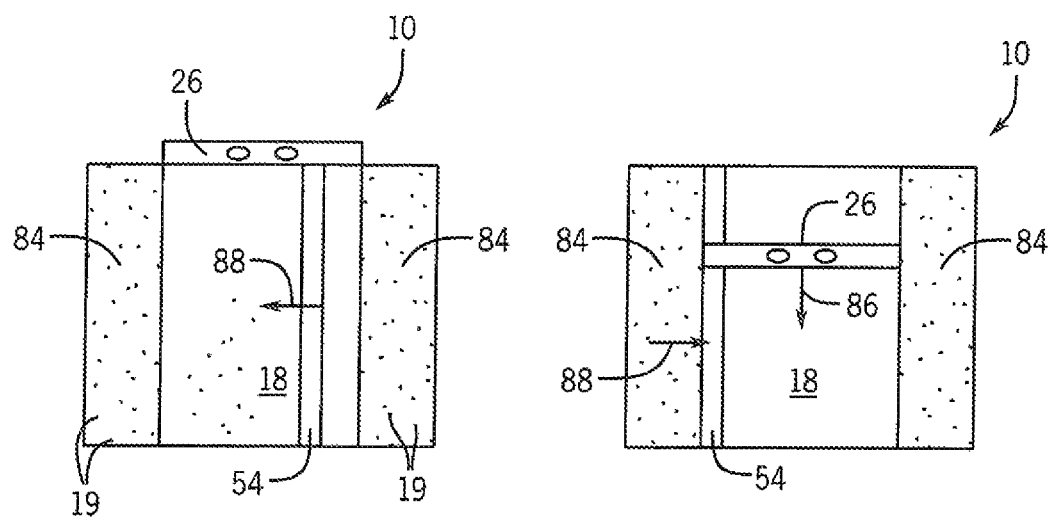
FIGS. 6a and 6b are top plan views of an alternative embodiment in which the sweeper and cathode-comb move in perpendicular directions with the sweeper shuttling between hoppers of powdered metal.

Referring now to FIGS. 6a and 6b, in an alternative embodiment, the sweeper 54 may be mounted to move perpendicularly to the cathode-comb 26 between longitudinally extending hoppers 84 of powdered metal 19 placed on opposite transverse sides of the powder bed 18. Between each longitudinal pass of the cathode comb 26, indicated by arrow 86, the sweeper 54 may shuttle between one reservoir 84 and the other to deposit a thin layer of powdered metal 19 over the powder bed 18 as indicated by arrow 88. During the movement of the cathode-comb 26, the sweeper 54 is parked against one of the hoppers 84 and an internal reservoir of the sweeper 54 may be recharged from that adjacent hopper 84.

Figure 3:
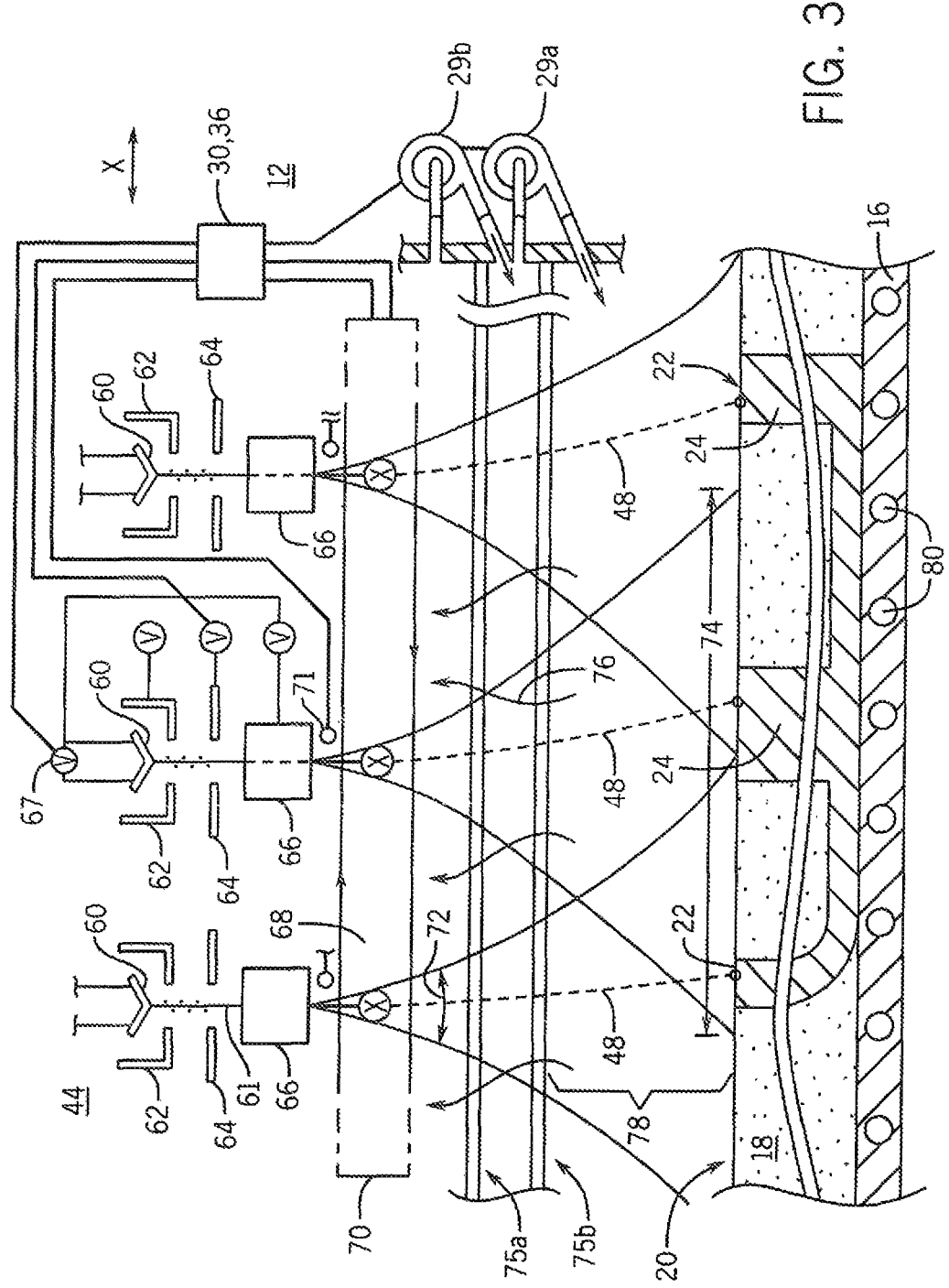
FIG. 3 is a fragmentary, front elevational block diagram of the cathode-comb 26 showing multiple independent cathodes and their associated electron optics and sweep coil and showing an overlapping of the electron beams as electronically steered by the sweep coil.
Figure 5:
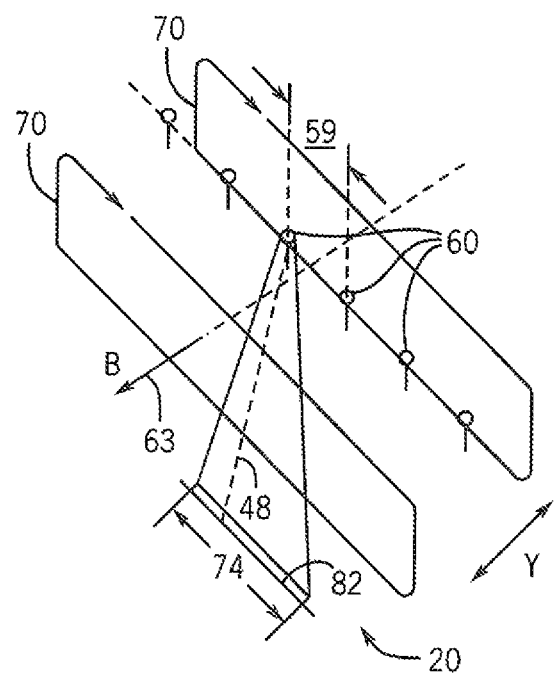
FIG. 5 is a fragmentary perspective phantom view of the cathode-comb 26 showing a common magnetic sweeper field generated for controlling electron beams.

Referring now to FIGS. 3 and 5, the volume 44 of the cathode-comb 26 supports a set of regularly, transversely spaced cathodes 60 at a spacing distance 59. In one embodiment the invention contemplates more than 10 cathodes; however, generally the number of cathodes will be selected to span the transverse dimension of the print surface 20 to provide a desired degree of beam overlap for a given angular sweep range of the beams and the distance between the cathode-comb 26 and the print surface, as will be discussed generally below.

Each cathode 60 may be, for example, a thermionic material such as lanthanum hexaboride, tungsten carbide, or dispenser cathode heated by ohmic heating of current passing through the cathode 60 generated by a cathode power supply 67 controllable by the computer 30. Alternatively, the cathode 60 may be heated by radiant heat from a separate heater element. In one embodiment, each cathode 60 may provide a wire form into a downwardly directed chevron to provide at a lower apex to a concentrated point of electron emissions to generate a tightly focused electron beam.

As is generally understood in the art, the cathode 60 may be surrounded by a Wehnelt cylinder 62 or the like biased to a negative voltage with respect to the cathode 60 (for example, −200 volts) to create a repulsive electrostatic field that directs the electron 61 in a beam 48 from the cathode 60 downward toward an anode 64 typically at a large positive voltage in the tens of kilovolts relative to the cathode 60 to strongly attract the electrons from the cathode 60. In practice, the anode 64 and the powder bed 18 are grounded for simplicity and safety and the relatively high positive voltage of the anode 64 with respect to the cathode 60 is obtained by operating the cathode 60 at a large negative voltage with respect to ground. The anode 64 may have a central opening 65 through which the electron beam 48 is accelerated. Electrons 61 of the beam 48 are then received by electron optics 66 such as focusing magnetic or electrostatic lenses of a type known in the art. Voltage sources to each of the Wehnelt cylinder 62, anode 64, and electron optics 66 may be computer-controlled. In particular the voltage on the Wehnelt cylinder 62 (or on a separate grid structure) may be controlled to switch the electron beam 48 of electrons 61 on or off as desired by the computer. An electron beam sensor 71 may confirm operation of the electron beam, for example, detecting magnetic fields associate with the passage of the electrons by detecting a corresponding magnetic field or by other techniques understood in the art. The sensor 71 may communicate with the computer 30 which may monitor the generation of electrons 61 in a beam 48.

The downwardly extending electron beam 48 is next received in a magnetic field region 68 provided by longitudinally opposed coils of a Helmholtz coil pair 70. The magnetic field is generally directed along the longitudinal axis to deflect the electron beam 48 within a vertical transversely extending plane at any angle within a steering angular range 72. Generally, the steering angular range 72 may be relatively small because of the architecture of the present invention and will normally be an angular range of less than 90 degrees and preferably less than 60 degrees to simplify the electron optics and reduce aberration and loss of printing resolution.

Generally, each coil of the Helmholtz coil pair 70 is spaced on either side of a vertical plane holding the cathode 60. Current passes through each coil of the Helmholtz coil pair 70 in the same direction (clockwise or counterclockwise) to produce a highly uniform longitudinal magnetic field 63 whose amplitude and polarity may be changed by changing the current flow through the Helmholtz coil pair 70 in unison by the computer 30. Desirably, the Helmholtz coil pair 70 will have a low inductance to be quickly switched for rapid steering of the electron beams 48.

The spacing of the cathodes 60 and the field strength of the Helmholtz coil pair 70 are selected to provide small angular ranges 72 that nevertheless provide a coverage region 74 for each electron beam along a transverse line on the print surface 20 of approximately twice the transverse spacing 59 of the cathode 60. In this way, adjacent electron beams 48 overlap so that a given point on the print surface 20 may be treated by either of two different electron beams 48 associate with different cathodes 60.

The electron beams 48, as steered by the Helmholtz coil pair 70, then pass through one or more aligned transversely extending slits 75. The slits 75 have a longitudinal width substantially equal to the narrow width of the electron beam 48 and thus provide a relatively low total area opening minimizing gas leakage therethrough. In one embodiment, two vertically aligned transversely extending slits 75a and 75b will be provided creating a gas baffle as will be described below. The entire path length between the cathodes 60 and the final slit 75b will be considered to be within the volume 44 of the housing 45.

Generally, one or more vacuum pumps 29 may be configured to pump gas from the housing 45 having a relatively hard vacuum into the softer vacuum of the housing 12. For example, when two slits 75 are used in a baffle configuration, a first vacuum pump 29a pumps gas from a space between the slits 75a and 75b to the housing 12 and a second vacuum pump 29b pumps gas from a volume 44 above the slits 75a into the space between the slits 75a and 75b.

Despite gas 76 leaking backward through the slits 75, the pumps 29 may preserve a low-pressure of approximately $10^{-4}$ Torr in the region of acceleration of the electron beam and for the majority of a path of the electron beam 48 toward the surface 20 while permitting the higher pressure in the housing 12 consistent with the need to maintain a vacuum in a larger volume with the inevitable outgassing of materials under heating. Generally, the amount of distance 78 traveled by the electron beam past the second slit 75b through the soft vacuum of the housing 12 will be reduced to the extent possible and may be, for example, less than six inches. The total path length from the cathodes 60 to the print surface 20 will typically be less than two feet.

The gas streams through the pumps 29 may be cooled by an intercooler fed by chilled water (not shown). The upper pump 29b may be, for example, a turbo pump operating at less than $10^{-4}$ Torr, for example, commercially available from Varian, Inc. having offices in Lexington, Mass. The lower pump 29a may be a roots blower, for example, of a type commercially available from Leybold Vacuum Products, Inc. having offices in Export, Pa.

Outside of the slits 75, the housing 45 is generally sealed. While it is contemplated that the slits 75 will be open to allow gas passage between the housing 45 and the housing 12, it will be appreciated that the low pressure differential across the slits provided by the present pumping system and the narrow size of the slits permits a thin window to be placed over the slits preventing gas exchange, for example, composed of a low electron scattering material such as beryllium or graphene.

Referring to FIG. 3, printing platform 16 may include a set of internal channels 80 allowing for the passage of cooled fluid such as gases or liquids as circulated by pumps (not shown) to help remove heat from the printed object 24 and the surrounding powder bed 18.

Figure 4A:
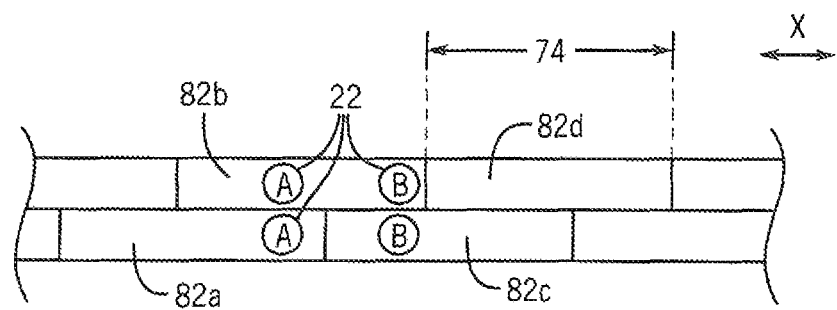
FIGS. 4a and 4b are diagrammatic representations of target zones on the print surface as associated with different electron beams and showing a coordination process that maximizes parallel production of melt zones.
Figure 4B:
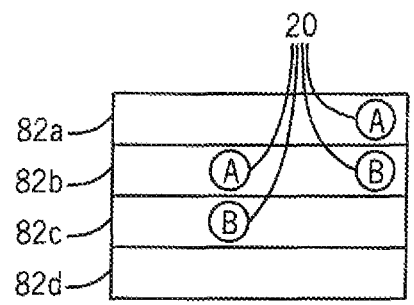

Referring now to FIG. 4a, the electron beams 48 from successive cathodes 60 at a given longitudinal position of the cathode-comb 26 define successive transversely spaced and overlapping treatment zones 82a-d. For clarity in FIG. 4, alternate treatment zones are offset downward so that they don't overlap. For a given longitudinal position of the cathode-comb 26, it may be desired to produce two melt spots 22 (designated A and B) that are within the range of either of two electron beams from different cathodes 60. For example, melt spot 22 (designated A) can be treated from a beam associated with zone 82a or beam associated with zone 82b. Likewise, melt spot 22 (designated B) can be treated by a beam associated with zone 82b or zone 82c. This leads to at least two different options for creating any given melt spot 22 and a large variety of different options for multiple given melt regions 22.

The computer 30 executing a stored program and working on data indicating desired locations of melt spots 22 may select between different cathodes 60 that may be used for any given melt spot 22 in order to increase parallel processing of the melt spots 22. For example, referring to FIG. 4b which depicts zones 82 aligned according to equal angle of beam deflection, it can be seen that two different beam deflection angles can be used to allow simultaneous creation of melt spots 22 for regions A and B using different cathodes 60. That is, regions A and B can be simultaneously treated (that is, without changing the beam angle) using the electron beams 48 of zone 82a and zone 82b, or alternatively using the electron beams 48 of zone 82b and zone 82c. This should be compared, for example, to using the electron beams 48 associated with zone 82a for treatment region A and the electron beam 48 associated with zone 82c for treatment region B which does not permit the simultaneous treatment by two different cathodes and thus timesaving option of parallel melting. Generally the selection of which cathode 60 will treat which treatment region (e.g. A or B) may consider not only process speed but also minimizing warping from thermal stress. This latter goal endeavors to maintain a more constant temperature at the treatment regions.

It will be appreciated that these considerations may create complex trade-offs among many additional melt spots 22 spread among many additional zones 82. This optimization process of maximizing parallel melt spot 22 generation and reducing thermal stress may be implemented by the computer 30, for example, using any one of a number of optimization techniques for minimizing printing time including gradient descent techniques or simulated annealing and the like which tied various assignments of different melt spots 22 to different cathodes 60 and their zones 82 to minimize the total required printing time.

Computer 30 may also monitor and react to cathode failure detected through sensor 71 to allow the adjacent electron beams 48 from adjacent cathodes 60 to fill in for a damaged or inoperative cathode 60. Such cathode failure may promote a recalculation of optimal beam positioning to produce a set of predetermined melt spots 22.

Generally, prior to the printing process, a three-dimensional model of the printed object 24 (shown in FIG. 1) may be generated using standard computer aided design (CAD) tools or a three-dimensional scanner. The model is then divided into a set of layers using "slicer" programs known in the art, such as Skeinforge. This process produces a set of melt zone areas for each layer, for example, as may be expressed in a control code for the three-dimension printer 10, for example, using a G-code formulation. This G code formulation is then optimized using the techniques discussed with respect to FIG. 4.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a processor can be understood to include one or more processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A three-dimension printer comprising:
   a print bed for supporting an object to be printed;
   an electron source bar extending along a transverse axis;
   an electron source bar carriage assembly supporting the electron source bar with respect to the print bed to move longitudinally above the print bed at a predetermined height above a print surface over the print bed;
   wherein the electron source bar supports a plurality of transversely separated electron sources for generating electron beams directed toward the print bed, each of the electron sources being controllably deflectable in the transverse direction by at least one electro deflector and provides electron beams that may be independently actuated;
   a powder handling system for applying powder at the print surface over the print bed; and
   a controller communicating with the electron sources and electron source bar carriage to scan the electron sources over powder on the print bed to selectively fuse the powder at the print surface into a printed object according to a program stored in a non-transient medium;
   wherein the controller scans the electron sources over transverse ranges so that each given electron source operates in a transverse range that overlaps a transverse range of operation of at least one adjacent electron source to provide parallel fabrication of connected portions of an object using multiple electron sources;
   wherein the electron beams are constrain to move substantially only in the transverse direction with respect to the electron source bar.

2. The three-dimension printer of claim 1 wherein the electron deflector provides a common deflection field across each of the electron beams to deflect the electron beams in unison.

3. The three-dimension printer of claim 2 wherein the deflection field is a magnetic field produced by at least one coil pair separated along a longitudinal axis.

4. The three-dimension printer of claim 1 wherein the electron sources are transversely spaced by one-half of a transverse range of deflection of the electron sources measured at the print surface.

5. The three-dimension printer of claim 1 further including a first housing holding a print bed and electron source bar and a second housing within the first housing holding the electron sources of the electron source bar and further including at least a first and second vacuum pump, the second vacuum pump communicating with the second sealable airtight housing to pump gas from the second sealable airtight housing into the first sealable airtight housing, and the first vacuum pump communicating with the first sealable airtight housing to pump gas from the first sealable airtight housing to an exhaust point outside of the first sealable airtight housing.

6. The three-dimension printer of claim 5 wherein the surface of the second housing closest to the print surface is less than six inches from the print surface.

7. The three-dimension printer of claim 5 wherein the second housing provides a transverse slit positioned between the electron sources and the print bed to allow passage of the electron beams throughout a transverse deflection of the electron beams and wherein the second housing is substantially sealed but for the transverse slit.

8. The three-dimension printer of claim 7 further including an electron transmissive window covering the slit.

9. The three-dimension printer of claim 5 further including a gas purge system for filling the second housing with a gas displacing oxygen when the first housing is unsealed.

10. The three-dimension printer of claim 5 wherein the electron sources include electron-emitting cathodes and wherein a majority of a path length of the electron beams between the cathodes and the print surface is within the second housing.

11. The three-dimension printer of claim 1 wherein the electron sources include electron-emitting cathodes spaced from the print surface by less than two feet.

12. The three-dimension printer of claim 1 wherein there are at least 10 electron sources and wherein the electron source bar carriage assembly provides a longitudinal movement of at least 15 feet.

13. The three-dimension printer of claim 1 wherein the powder handling system provides a movable powder spreader controllably movable along a plane above the print bed to apply powder to the print bed.

14. The three-dimension printer of claim 1 further including a powder preheat heater positionable to move along the longitudinal direction over the print bed.

15. The three-dimension printer of claim 1 wherein the controller executes the program to receive identifications of regions on the print surface for melting by an electron beam and selects among different electron beams capable of melting that region at a given location of the electron source bar to promote parallel operation of electron beams.

16. The three-dimensional printer of claim 1 wherein a range of transverse deflection of each of the electron beams of the electron sources and a separation of the electron sources from the print surface is such as to permit at least one electron beam to fuse the powder at the print surface anywhere along a transverse line between points beneath two adjacent, electron sources.

17. The three-dimensional printer of claim 2 wherein the common deflection field provides only a single axis of deflection.

18. A three-dimension printer comprising:
a print bed for supporting an object to be printed;
an electron source bar extending along a transverse axis;
an electron source bar carriage assembly supporting the electron source bar with respect to the print bed to move longitudinally above the print bed at a predetermined height above a print surface over the print bed;
wherein the electron source bar supports a plurality of independently controllable, transversely separated electron sources for generating electron beams directed toward the print bed and an electron deflector assembly for transverse deflection of the electron beams;
a powder handling system for applying powder at the print surface over the print bed; and
a controller communicating with the electron sources and electron source bar carriage to scan the electron sources over powder on the print bed to selectively fuse the powder at the print surface into a printed object according to a program stored in a non-transient medium;
further including a first housing holding a print bed and electron source bar and a second housing within the first housing holding the electron sources of the electron source bar and further including at least a first and second vacuum pump, the second vacuum pump communicating with the second sealable airtight housing to pump gas from the second sealable airtight housing into the first sealable airtight housing, and the first vacuum pump communicating with the first sealable airtight housing to pump gas from the first sealable airtight housing to an exhaust point outside of the first sealable airtight housing; and
wherein the electron beams are constrained to move substantially only in the transverse direction with respect to the electron source bar; and
wherein the second housing provides a transverse slit positioned between the electron sources and the print bed to allow passage of the electron beams throughout a transverse deflection of the electron beams the transverse slit having a longitudinal width substantially equal to a longitudinal width of the electron beams and wherein the second housing is substantially sealed but for the transverse slit.

19. The three-dimension printer of claim 18 wherein the first vacuum pump provides a higher-pressure vacuum in the first sealable airtight housing than the second vacuum pump provides in the second sealable airtight housing.

20. The three-dimension printer of claim 19 wherein the second vacuum pump operates to maintain a hard vacuum with a pressure of less than $10^{-4}$ Torr.

21. The three-dimension printer of claim 19 wherein the first vacuum pump operates to maintain a soft vacuum with a pressure greater than $10^{-4}$ Torr.

22. A three-dimension printer comprising:
a print bed for supporting an object to be printed;
an electron source bar extending along a transverse axis;
an electron source bar carriage assembly supporting the electron source bar with respect to the print bed to move longitudinally above the print bed at a predetermined height above a print surface over the print bed;
wherein the electron source bar supports a plurality of independently controllable, transversely separated electron sources for generating electron beams directed toward the print bed and an electron deflector assembly for transverse deflection of the electron beams;
a powder handling system for applying powder at the print surface over the print bed;
a controller communicating with the electron sources and electron source bar carriage to scan the electron sources over powder on the print bed to selectively fuse the powder at the print surface into a printed object according to a program stored in a non-transient medium;
wherein the electron beams are constrained to move primarily in the transverse direction with respect to the electron source bar than in the longitudinal direction; and
further including a powder preheat heater positionable to move along the longitudinal direction over the print bed with and ahead of movement of the electron source bar to heat the powder at the print surface to reduce the amount of heat required from the electron beams to melt the powder.

23. A three-dimension printer comprising:
a print bed for supporting an object to be printed;
an electron source bar extending along a transverse axis;
an electron source bar carriage assembly supporting the electron source bar with respect to the print bed to move longitudinally above the print bed at a predetermined height above a print surface over the print bed;
wherein the electron source bar supports a plurality of independently controllable, transversely separated beam sources for generating and controllably directing beams directed toward the print bed;
a powder handling system for applying powder at the print surface over the print bed; and
a controller communicating with the beam sources and electron source bar carriage to scan the beam sources over powder on the print bed to selectively fuse the powder at the print surface into a printed object according to a program stored in a non-transient medium;
wherein the controller executes the program to receive identifications of regions on the print surface for melting by a beam and selects among different beams capable of melting that region at a given location of the electron source bar to promote parallel operation of beams in which processor speed is increased by simultaneous operation of beam sources.

24. The three-dimension printer of claim 23 wherein each beam source is associated with a beam detector, and wherein the controller further executes the program to compensate for failure of an individual beam source by employing at least one adjacent beam source.

25. A three-dimension printer comprising:
a print bed for supporting an object to be printed;
an electron source bar extending along a transverse axis;
an electron source bar carriage assembly supporting the electron source bar with respect to the print bed to move longitudinally above the print bed at an elevation above a print surface over the print bed to provide printing over a contiguous transverse extent;

wherein the electron source bar supports at least ten transversely separated electron sources having an elevation from the print surface of less than two feet and together providing a printing over a transverse extent at least five times the elevation;

wherein each of the electron sources is controllably deflectable in the transverse direction and provides electron beams that may be independently actuated, the electron sources having an elevation from the print surface of less than two feet and distributed along the electron source bar by a distance of at least five times the elevation;

a powder handling system for applying powder at the print surface over the print bed; and a controller communicating with the electron sources and electron source bar carriage to scan the electron sources over powder on the print bed to selectively fuse the powder at the print surface into a printed object according to a program stored in a non-transient medium.

* * * * *